(12) United States Patent
Du et al.

(10) Patent No.: US 11,256,380 B2
(45) Date of Patent: Feb. 22, 2022

(54) TOUCH PANEL, METHOD FOR MANUFACTURING THE SAME AND DISPLAY DEVICE

(71) Applicant: YUNGU (GU'AN) TECHNOLOGY CO., LTD., Langfang (CN)

(72) Inventors: Jiamei Du, Langfang (CN); Dongkun Liu, Langfang (CN); Jinqiang Liu, Langfang (CN); Yawei Liu, Langfang (CN); Yaoyan Wu, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 0 days.

(21) Appl. No.: 16/718,209

(22) Filed: Dec. 18, 2019

(65) Prior Publication Data

US 2020/0125198 A1 Apr. 23, 2020

Related U.S. Application Data

(63) Continuation of application No. PCT/CN2018/119004, filed on Dec. 3, 2018.

(30) Foreign Application Priority Data

Jun. 30, 2018 (CN) .......................... 201821027277.3

(51) Int. Cl.
*G06F 3/047* (2006.01)
*H01B 1/22* (2006.01)

(52) U.S. Cl.
CPC ............... *G06F 3/047* (2013.01); *H01B 1/22* (2013.01)

(58) Field of Classification Search
CPC .......... G06F 3/047; G06F 2203/04103; G06F 3/041; H01B 1/22; H01B 5/14
See application file for complete search history.

(56) References Cited

U.S. PATENT DOCUMENTS

| 7,455,757 B2 * | 11/2008 | Oh ........................ C25D 5/022 |
| | | 204/490 |
| 9,754,698 B2 * | 9/2017 | Shin ........................ H01B 1/22 |

(Continued)

FOREIGN PATENT DOCUMENTS

| CN | 104020882 A | 9/2014 |
| CN | 105204695 A | 12/2015 |

(Continued)

OTHER PUBLICATIONS

First Office Action of Chinese Application No. 201821027277.3.

*Primary Examiner* — Grant Sitta
(74) *Attorney, Agent, or Firm* — Kilpatrick Townsend & Stockton

(57) ABSTRACT

The present application provides a touch panel, a method for manufacturing the same and a display device. The touch panel includes a substrate and a metal nanowire conductive layer and an adhesion enhancement layer stacked on the substrate, the adhesion enhancement layer increases the adhesiveness between the substrate and the metal nanowire conductive layer; the adhesion enhancement layer has a stereo three-dimensional network structure capable of preventing agglomeration of the adhesion enhancement layer and formation of dead volume that leads to reduction in the conductivity of the metal nanowire conductive layer.

18 Claims, 3 Drawing Sheets

(56) References Cited

U.S. PATENT DOCUMENTS

| | | | | |
|---|---|---|---|---|
| 2012/0132930 A1* | 5/2012 | Young | ............... | H01L 31/0481 |
| | | | | 257/84 |
| 2013/0341074 A1* | 12/2013 | Virkar | .................... | H05K 1/097 |
| | | | | 174/255 |
| 2013/0342221 A1* | 12/2013 | Virkar | .................... | G06F 3/045 |
| | | | | 324/661 |
| 2015/0290715 A1* | 10/2015 | Moody | ................ | B22F 1/0025 |
| | | | | 420/501 |
| 2016/0103539 A1* | 4/2016 | Jinbo | ................... | G06F 1/1652 |
| | | | | 345/173 |
| 2016/0114395 A1* | 4/2016 | Kim | ..................... | B22F 1/0025 |
| | | | | 252/514 |
| 2016/0282978 A1* | 9/2016 | Wang | ...................... | B32B 7/12 |
| 2017/0003808 A1* | 1/2017 | Kim | ..................... | H01L 27/323 |
| 2017/0183255 A1* | 6/2017 | Walther | ................... | C03B 17/06 |
| 2017/0360717 A1* | 12/2017 | Desai | .................... | A61K 47/34 |
| 2018/0033516 A1* | 2/2018 | Lee | ....................... | B82Y 40/00 |
| 2019/0114003 A1* | 4/2019 | Gao | ..................... | G06F 3/0446 |

FOREIGN PATENT DOCUMENTS

| | | | |
|---|---|---|---|
| CN | 106990857 A | | 7/2017 |
| JP | 2014102962 A | | 6/2014 |
| KR | 20170129015 | * | 11/2017 |
| KR | 20170129015 A | | 11/2017 |

\* cited by examiner

TOUCH PANEL, METHOD FOR MANUFACTURING THE SAME AND DISPLAY DEVICE

CROSS-REFERENCES TO RELATED APPLICATIONS

The present application is a continuation application of PCT Application No. PCT/CN2018/119004, filed Dec. 3, 2018, which claims priority to Chinese Patent Application No. 201821027277.3, filed Jun. 30, 2018. Both applications are incorporated by reference herein for all purposes.

TECHNICAL FIELD

The present application relates to the field of display technology.

BACKGROUND

In a conventional touch panel, the material of the touch electrode is usually indium tin oxide (ITO), which has a high light transmittance and good electrical conductivity. However, the electrical conductivity and sensitivity of the touch panel cannot be guaranteed when ITO is applied to a large-sized touch panel due to large surface resistance of ITO. In addition, the overall production cost of ITO is expensive and ITO can be easily damaged. Therefore, metal nanowires have gradually become a material to replace ITO.

SUMMARY

The present application is aimed at providing a touch panel and a method for manufacturing the same and a display device, so as to solve the problem that it is difficult for the conventional production process of metal nanowires to meet the requirements for adhesiveness and electrical conductivity.

To this end, an embodiment of the present application provides a touch panel, comprising: a substrate; and a metal nanowire conductive layer and an adhesion enhancement layer stacked on the substrate, the adhesion enhancement layer having a stereo three-dimensional network structure.

Optionally, the metal nanowire conductive layer comprises a plurality of crosswise stacked metal nanowires lap-jointed with one another to form a conductive network.

Optionally, the metal nanowire conductive layer further comprises matrix for the metal nanowires to be stacked therein.

Optionally, the adhesion enhancement layer comprises: a stereo framework; and a plurality of intercommunicating pores formed in the stereo framework with an intercommunicating structure so as to form a three-dimensional network.

Optionally, the adhesion enhancement layer is on the substrate, the metal nanowire conductive layer is on the adhesion enhancement layer, and at least part of the metal nanowires in the metal nanowire conductive layer extend outwardly and into the intercommunicating pores of the adhesion enhancement layer.

Optionally, the adhesion enhancement layer and the metal nanowire conductive layer are mutually embedded into each other, and at least part of the metal nanowires in the metal nanowire conductive layer extend into the intercommunicating pores of the adhesion enhancement layer.

Optionally, the intercommunicating pores are selected from one of, or a combination of more than one of, a circular hole, an oval hole and an irregular hole.

Optionally, the metal nanowire conductive layer has a thickness of 10 nm-200 nm, and the adhesion enhancement layer has a thickness of 10 nm-300 nm.

Optionally, the metal nanowire conductive layer and the adhesion enhancement layer have a total thickness of less than 400 nm.

Optionally, the material of the adhesion enhancement layer comprises at least one of high molecular polymer, nitride and oxide.

Optionally, the adhesion enhancement layer is made from one or more of polyamide resin, polyurethane resin and epoxy resin.

Optionally, the metal nanowire conductive layer is a silver nanowire conductive layer.

Optionally, the metal nanowires each has a length of 20 μm-50 μm, a diameter of less than 50 nm, and a length-to-diameter ratio of greater than 500.

Optionally, the intercommunicating pores have an opening size greater than a diameter of the metal nanowires.

Optionally, the touch panel further comprises a cover plate and a bonding layer, the bonding layer is located between the metal nanowire conductive layer and the cover plate to bond the substrate and the cover plate together; and a wiring layer further arranged between the metal nanowire conductive layer and the bonding layer is located within a bezel area of the touch panel.

An embodiment of the present application further provides a display device, comprising the aforementioned touch panel.

An embodiment of the present application further provides a method for manufacturing a touch panel, comprising: providing a substrate; and forming a metal nanowire conductive layer and an adhesion enhancement layer stacked on the substrate, the adhesion enhancement layer having a stereo three-dimensional network structure.

Optionally, the step of forming a metal nanowire conductive layer and an adhesion enhancement layer stacked on the substrate comprises: forming the adhesion enhancement layer on the substrate by a template method; and forming the metal nanowire conductive layer on the adhesion enhancement layer.

Optionally, the step of forming a metal nanowire conductive layer and an adhesion enhancement layer stacked on the substrate comprises: forming the metal nanowire conductive layer on the substrate; and forming the adhesion enhancement layer on the metal nanowire conductive layer.

Optionally, the step of forming the adhesion enhancement layer on the substrate by a template method comprises: providing an organic optical adhesive solution; adding metal particles into the organic optical adhesive solution to form a templated solution; coating the templated solution on the substrate; curing the templated solution coated on the substrate; and dissolving the metal particles in the templated solution with an acid liquid, thereby forming the adhesion enhancement layer with a stereo three-dimensional network structure.

The touch panel and display device provided by the present application comprises a substrate and a metal nanowire conductive layer and an adhesion enhancement layer stacked on the substrate, the adhesion enhancement layer increases the adhesiveness between the substrate and the metal nanowire conductive layer; the adhesion enhancement layer has a stereo three-dimensional network structure capable of preventing agglomeration of the adhesion enhancement layer and formation of dead volume that leads to reduction in the conductivity of the metal nanowire conductive layer. The present application increases the electrical conductivity of the metal nanowire conductive layer without reducing the adhesion force between the metal nanowire conductive layer and the substrate, which in turn increases the electrical conductivity and sensitivity of the touch panel and the display device.

1—substrate, 2—adhesion enhancement layer, 3—metal nanowire conductive layer, 31—metal nanowire, 4—stereo framework, 5—intercommunicating pore.

DETAILED DESCRIPTION OF THE INVENTION

It is difficult for the conventional production process of metal nanowires to meet the requirements for both adhesiveness and electrical conductivity. Currently, in the production process of a touch panel with metal nanowires, a metal nanowire solution is usually directly coated on a substrate to form a metal nanowire conductive layer. However, with poor adhesiveness of the metal nanowire conductive layer on the substrate, there is a necessity for the metal nanowire conductive layer to be coated with an adhesion enhancement layer, so as to improve the adhesive force between the metal nanowire conductive layer and the substrate. However, although coating an adhesion enhancement layer addresses the problem of adhesion between the metal nanowire conductive layer and the substrate to a certain extent, the adhesion enhancement layer tends to agglomerate to form dead volume because of its stickiness, which can't give a full play to the conductivity of the metal nanowire conductive layer, and as a result, the electrical conductivity of the metal nanowire conductive layer is reduced, failing to meet the requirements for both adhesiveness and electrical conductivity.

An embodiment of the present application provides a touch panel and a display device, comprising a substrate and a metal nanowire conductive layer and an adhesion enhancement layer stacked on the substrate, the adhesion enhancement layer increases the adhesiveness between the substrate and the metal nanowire conductive layer; and the adhesion enhancement layer has a stereo three-dimensional network structure capable of preventing agglomeration of the adhesion enhancement layer and formation of dead volume that leads to reduction in the conductivity of the metal nanowire conductive layer. The present application increases the electrical conductivity of the metal nanowire conductive layer without reducing the adhesion force between the metal nanowire conductive layer and the substrate, which in turn increases the electrical conductivity and sensitivity of the touch panel and the display device.

Specific implementing ways of the present application will be described below with more detail in conjunction with the diagrams.

Figure 1:
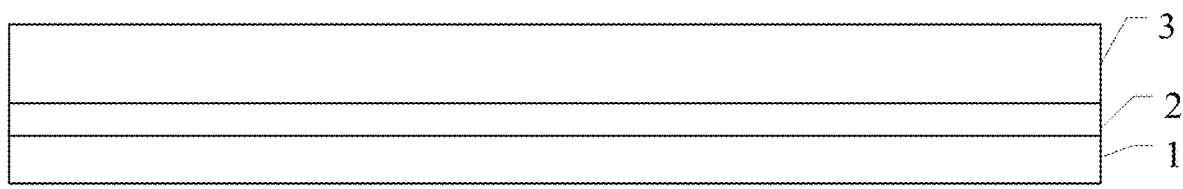
FIG. 1 is a structural diagram of a touch panel provided by an embodiment of the present application.

Referring to FIG. 1, which illustrates a diagram of the touch panel provided by this embodiment, the touch panel comprises a substrate 1 and a metal nanowire conductive layer 3 and an adhesion enhancement layer 2 stacked on the substrate 1, the adhesion enhancement layer 2 has a stereo three-dimensional network structure.

Specifically, the substrate 1 provides support for the whole touch panel. The substrate 1 comprises a visible area and a bezel area with the latter one surrounding the former one. For example, the substrate 1 is rectangular and the bezel area is located on edges of the substrate 1 and has an annular shape. The visible area of the substrate is usually used for light transmission display, and the bezel area is usually opaque to highlight the display contents of the visible area. The substrate 1 is usually made of a transparent insulating material. Specifically, the substrate 1 can be a rigid substrate made of glass, metal, or ceramic material; or the substrate 1 can be a flexible substrate formed from any proper insulating material such as acryl, polymethyl methacrylate (PMMA), polyacrylonitrile-butadiene-styrene (ABS), polyamide (PA), polyimide (PI), polybenzimidazole polybutene (PB), polybutylene terephthalate (PBT), polycarbonate (PC), polyether ether ketone (PEEK), polyether imide (PEI), polyether sulfone (PES), polyethylene (PE), polyethylene terephthalate (PET), polyethylene tetrafluoroethylene (ETFE), polyepoxyethane, polyglycolic acid (PGA), poly-methyl-pentene (PMP), polyoxymethylene (POM), polyphenylene ether (PPE), polypropylene (PP), polystyrene (PS), polytetrafluoroethylene (PTFE), polyurethane (PU), polyvinyl chloride (PVC), polyvinylidene (PVF), polyvinylidene chloride (PVDC), poly vinylidene fluoride (PVDF) or styrene-acrylonitrile (SAN). In this embodiment, the substrate 1 is a flexible substrate.

Figure 2:
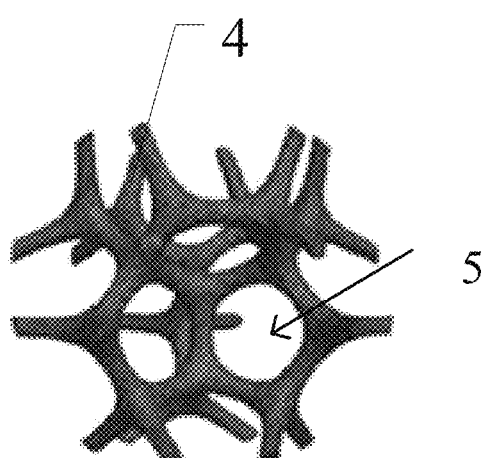
FIG. 2 is a structural diagram of a stereo framework provided by an embodiment of the present application.

The adhesion enhancement layer 2 increases the adhesiveness between the substrate 1 and the metal nanowire conductive layer 3; and, the adhesion enhancement layer 2 has a stereo three-dimensional network structure capable of preventing agglomeration of the adhesion enhancement layer and formation of dead volume that leads to reduction in the conductivity of the metal nanowire conductive layer 3. Referring to FIG. 2, the adhesion enhancement layer 2 having the three-dimensional network structure comprises a stereo framework 4 and intercommunicating pores 5 formed in the stereo framework 4 with an intercommunicating structure so as to form a three-dimensional network. The intercommunicating pores 5 are selected from one or more of a circular hole, an oval hole and an irregular hole. The material of the adhesion enhancement layer 2 comprises one or more of high molecular polymer, nitride and oxide, the high molecular polymer can be a sticky organic material such as polyvinyl alcohol (PVA), polyvinyl butyral (PVB resin), polyaniline (PAN or PANI), polyphenylene ether (PPE), polyparaphenylene acetylene (PPV), poly(3,4-ethylene)dioxythiophene (PEDOT), polystyrene sulfonic acid (PSS), poly(3-hexyl)thiophene (P3HT), poly(3-octyl)thiophene (P3OT), poly(C-61-butyric acid-methyl ester) (PCBM), poly[2-methoxy-5-(2-ethyl-hexyloxy)-1,4-phenylene ethylene] (MEH-PPV). The nitride may be silicon nitride, and the oxide may be silicon oxide. In this embodiment, the adhesion enhancement layer 2 is an organic optical adhesive prepared using one or more of adhesive materials such as polyamide resins, polyurethane resins and epoxy resins, and the intercommunicating pores 5 formed in the stereo framework 4 are circular pores.

Optionally, the adhesion enhancement layer 2 having the three-dimensional network structure may be prepared by a template method, for example: metal particles are added into the organic optical adhesive solution to form a templated solution, the templated solution is coated on the substrate 1, the templated solution coated on the substrate 1 is cured, and finally the metal particles in the templated solution are dissolved with an acid liquid (for example, 5% phosphoric acid solution), thereby forming the adhesion enhancement layer 2 with a stereo three-dimensional network structure. The curing method can be natural drying, simple baking or heat-curing, etc., the heat-curing is, for example, infrared heating, hot air heating, etc. Further, the adhesion enhancement layer 2 can be formed on the substrate 1 by using a template method, and then the metal nanowire conductive layer 3 is formed on the adhesion enhancement layer 2 to prevent the acid liquid from affecting the metal nanowire conductive layer 3. Of course, the metal nanowire conductive layer 3 can be formed on the substrate 1 first, and then the adhesion enhancement layer 2 can be formed on the metal nanowire conductive layer 3, so that the metal nanowire conductive layer 3 and the adhesion enhancement layer 2 can be better embedded into each other.

Figure 3:
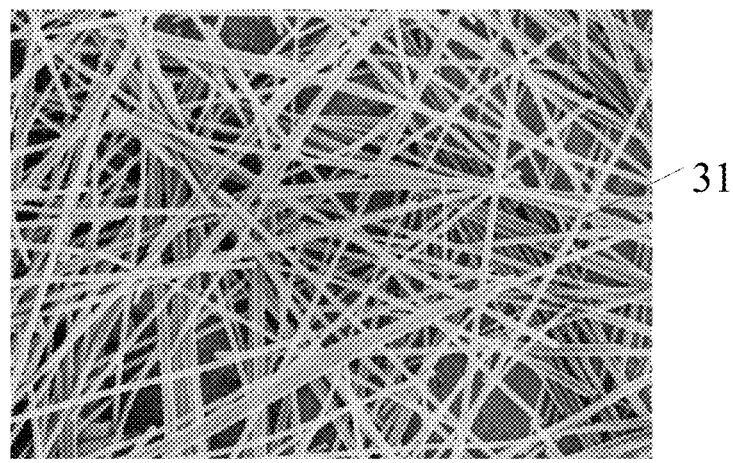
FIG. 3 is a structural diagram of metal nanowires provided by an embodiment of the present application.

Further, referring to FIG. 3, the metal nanowire conductive layer 3 comprises a plurality of crosswise stacked metal nanowires 31, and a conductive network is formed from the plurality of metal nanowires 31 lap jointed with one another by molecular force. Optionally, the metal nanowire conductive layer 3 may further comprise matrix with the metal nanowires stacked therein for protecting the metal nanowires 31 from influence by external factors such as corrosion, abrasion, etc. The metal nanowires can be nanowires of gold (Au), silver (Ag), platinum (Pt), copper (Cu), cobalt (Co), palladium (Pd), etc. The metal nanowires are preferably silver nanowires because silver has high conductivity and good light transmission.

As shown in FIG. 1, in this embodiment, the adhesion enhancement layer 2 is located on the substrate 1, and the metal nanowire conductive layer 3 is located on the adhesion enhancement layer 2. A least part of metal nanowires 31 in the metal nanowire conductive layer 3 extend outwardly (towards the substrate 1) and enter the intercommunicating pores 5 of the adhesion enhancement layer 2. Of course, the adhesion enhancement layer 2 and the metal nanowire conductive layer 3 can also be embedded into each other, and the metal nanowires in the metal nanowire conductive layer 3 at least partially enter the intercommunicating pores 5 of the adhesion enhancement layer 2.

Further, the length of the metal nanowires 31 is, for example, 20 μm to 50 μm, and the diameter thereof is, for example, less than 50 nm, and the length-to-diameter ratio (that is, the ratio of the length to the diameter) is, for example, greater than 500. At least part of the metal nanowires 31 in the metal nanowire conductive layer 3 are embedded into the intercommunicating pores 5. Optionally, one metal nanowire 31 can be located in multiple intercommunicating pores 5 at the same time. Alternatively, one metal nanowire 31 may be partially located in an intercommunicating pore 5 of the adhesion enhancement layer 2 and partially located on the adhesion enhancement layer 2. Further, the size of the intercommunicating pores 5 can be greater than the diameter of the metal nanowires 31, so that the metal nanowires 31 can be better embedded into the intercommunicating pores 5. As shown in FIG. 2, in this embodiment, the intercommunicating pores 5 are circular holes, and the diameter of the circular intercommunicating pores 5 can be equal to or greater than 50 nm.

The metal nanowire conductive layer 3 may have a thickness of 10 nm to 200 nm, for example, 50 nm, 100 nm or 150 nm, etc. The adhesion enhancement layer 2 may have a thickness of 10 nm to 300 nm, for example, 100 nm, 200 nm or 150 nm, etc. The metal nanowire conductive layer 3 and the adhesion enhancement layer 2 may have a total thickness of less than 400 nm to avoid the touch panel being too thick.

The touch panel may further comprise a cover plate and a bonding layer, the bonding layer is located between the metal nanowire conductive layer 3 and the cover plate to bond the substrate and the cover plate together. Optionally, a wiring layer further arranged between the metal nanowire conductive layer 3 and the bonding layer is located within a bezel area of the touch panel. The material of the wiring layer may be one or more of silver, gold, indium tin oxide, metal mesh or graphene.

Based on the above, an embodiment of the present application further provides a display device, comprising the aforementioned touch panel. The display device can be a touch screen of mobile phones, tablets, watches, computers, refrigerators, washing machines, induction cookers, etc.

In summary, in the embodiments of the present application, the provided touch panel and display device comprise a metal nanowire conductive layer and an adhesion enhancement layer, the adhesion enhancement layer increases the adhesion force between the substrate and the metal nanowire conductive layer, and the adhesion enhancement layer has a stereo three-dimensional network structure; the metal nanowire conductive layer is at least partially embedded into the three-dimensional network structure of the adhesion enhancement layer in the thickness direction, thereby preventing agglomeration of the adhesion enhancement layer and formation of dead volume that leads to reduction in the conductivity of the metal nanowire conductive layer. The present application increases the electrical conductivity of the metal nanowire conductive layer without reducing the adhesion force between the metal nanowire conductive layer and the substrate, which in turn increases the electrical conductivity and sensitivity of the touch panel.

The above description, which is only about preferable embodiments of the present application, is by no means to impose any limitation on the present application. Any form of equivalent substitution or modification to the technical solution and contents disclosed by the present application, made by a person with ordinary skill in the art without departing from the scope of the technical solution of the present application, belongs to the contents of the technical solution of the present application and still falls into the protection scope of the present application.

The invention claimed is:

1. A touch panel, comprising:
   a substrate; and
   a metal nanowire conductive layer and an adhesion enhancement layer stacked on the substrate, the adhesion enhancement layer having a stereo three-dimensional network structure;
   wherein the three-dimensional network structure comprises a plurality of intercommunicating pores configured to interact with the metal nanowire conductive layer for adhesion enhancement;
   wherein the three-dimensional network structure is formed by a method comprising:
   providing an organic optical adhesive solution;
   adding metal particles into the organic optical adhesive solution to form a templated solution;
   coating the templated solution on the substrate;
   curing the templated solution coated on the substrate; and
   dissolving the metal particles in the templated solution with an acid liquid, thereby forming the adhesion enhancement layer.

2. The touch panel in accordance with claim 1, wherein the metal nanowire conductive layer comprises a plurality of crosswise stacked metal nanowires lap jointed with one another to form a conductive network.

3. The touch panel in accordance with claim 2, wherein the metal nanowire conductive layer further comprises matrix for the metal nanowires to be stacked therein.

4. The touch panel in accordance with claim 1, wherein the adhesion enhancement layer is on the substrate, the metal nanowire conductive layer is on the adhesion enhancement layer, and at least part of the metal nanowires in the metal nanowire conductive layer extend outwardly and into the intercommunicating pores of the adhesion enhancement layer.

5. The touch panel in accordance with claim 1, wherein the adhesion enhancement layer and the metal nanowire conductive layer are mutually embedded into each other, and at least part of the metal nanowires in the metal nanowire conductive layer extend into the intercommunicating pores of the adhesion enhancement layer.

6. The touch panel in accordance with claim 1, wherein the intercommunicating pores are selected from one of, or a combination of more than one of, a circular hole, an oval hole and an irregular hole.

7. The touch panel in accordance with claim 1, wherein the metal nanowire conductive layer has a thickness of 10 nm-200 nm, and the adhesion enhancement layer has a thickness of 10 nm-300 nm.

8. The touch panel in accordance with claim 1, wherein the metal nanowire conductive layer and the adhesion enhancement layer have a total thickness of less than 400 nm.

9. The touch panel in accordance with claim 1, wherein the material of the adhesion enhancement layer comprises at least one of high molecular polymer, nitride and oxide.

10. The touch panel in accordance with claim 9, wherein the adhesion enhancement layer is made from one or more of polyamide resin, polyurethane resin and epoxy resin.

11. The touch panel in accordance with claim 1, wherein the metal nanowire conductive layer is a silver nanowire conductive layer.

12. The touch panel in accordance with claim 2, wherein the metal nanowires each has a length of 20 μm-50 μm, a diameter of less than 50 nm, and a length-to-diameter ratio of greater than 500.

13. The touch panel in accordance with claim 1, wherein the intercommunicating pores have an opening size greater than a diameter of the metal nanowires.

14. The touch panel in accordance with claim 2, wherein the plurality of intercommunicating pores is configured as being greater than the metal nanowires in size for adhesion enhancement.

15. The touch panel in accordance with claim 12, wherein a diameter of the intercommunicating pores is equal to or greater than 50 nm.

16. A touch panel, comprising:
a substrate; and
a metal nanowire conductive layer and an adhesion enhancement layer stacked on the substrate, the adhesion enhancement layer having a three-dimensional network structure;
wherein the three-dimensional network structure comprises a plurality of intercommunicating pores configured to interact with the metal nanowire conductive layer for adhesion enhancement;
wherein the metal nanowire conductive layer comprises a plurality of crosswire stacked metal nanowires lap-jointed with one another to form a conductive network;
wherein the metal nanowire is partially located in the intercommunicating pore and partially located on the adhesion enhancement layer for adhesion enhancement.

17. A touch panel, comprising:
a substrate; and
a metal nanowire conductive layer and an adhesion enhancement layer stacked on the substrate, the adhesion enhancement layer having a three-dimensional network structure;
wherein the three-dimensional network structure comprises a plurality of intercommunicating pores configured to interact with the metal nanowire conductive layer for adhesion enhancement,
the metal nanowire conductive layer has a thickness of 10 nm-200 nm, and the adhesion enhancement layer has a thickness of 10 nm-300 nm.

18. The touch panel in accordance with claim 17, wherein the metal nanowire conductive layer and the adhesion enhancement layer have a total thickness of less than 400 nm.

* * * * *